United States Patent [19]
Yu

[11] Patent Number: 6,087,974
[45] Date of Patent: Jul. 11, 2000

[54] MONOPULSE SYSTEM FOR TARGET LOCATION

[75] Inventor: Kai-Bor Yu, Niskayuna, N.Y.

[73] Assignee: Lockheed Martin Corporation, Syracuse, N.Y.

[21] Appl. No.: 09/128,282

[22] Filed: Aug. 3, 1998

[51] Int. Cl.[7] .................................................. G01S 13/72
[52] U.S. Cl. .............................. 342/62; 342/73; 342/74; 342/75; 342/80; 342/147; 342/149; 342/195; 342/13; 342/14; 342/16; 244/3.1; 244/3.15; 244/3.19
[58] Field of Search ............................... 342/61, 62, 67, 342/73, 74, 80, 147, 149, 150, 151, 152, 153, 154, 175, 195, 378, 379, 380, 381, 382, 383, 384, 385, 417, 422, 427, 29, 75, 13, 14, 15, 16, 17, 18, 19, 20; 244/3.1, 13.15, 3.19

[56] References Cited

U.S. PATENT DOCUMENTS 5,371,506  12/1994  Yu et al. ................................. 342/380
5,382,954  1/1995   Kennedy, Jr. et al. ................ 342/29 X Primary Examiner—Bernarr E. Gregory
Attorney, Agent, or Firm—W. H. Meise; P. J. Checkovich

[57] ABSTRACT

A monopulse system generates sum ($\Sigma$), elevation difference ($\Delta_{EL}$), azimuth difference ($\Delta_{AZ}$), and double difference ($\Delta_\Delta$) signals, and generates a covariance matrix. The covariance matrix is decomposed to produce at least the principal eigenvector. The location or angular direction within the main beam of a single target is determined from the real component of the quotient of elements of the principal eigenvector, by the use of a look-up table. In another embodiment of the invention, the eigenvalues are generated from the covariance matrix, and the number of significant eigenvalues determines the number of targets within the main beam. If a single target is found, its location is found as described above. If two targets are found in the main beam, the locations of the two targets are determined by a closed-form solution of quadratic equations. A missile using a monopulse radar according to an aspect of the invention determines the presence of two targets within the main beam, which targets may be a real target and a decoy, and uses extrinsic information to identify a selected target as being the true target. The missile is homed in the direction of the selected target.

9 Claims, 4 Drawing Sheets

US 6,087,974

MONOPULSE SYSTEM FOR TARGET LOCATION

FIELD OF THE INVENTION

This invention relates to arrangements, systems or receivers using monopulse techniques, such as those receivers used for radar surveillance or for radio-frequency (RF) missile seekers, and more particularly to improved arrangements for locating targets, including multiple targets, within the main beam of the antenna.

BACKGROUND OF THE INVENTION

A monopulse antenna system includes plural antenna elements which receive the signal whose location is to be identified, and also includes various couplers which add the signals from various combinations of the antenna elements for generating sum signals, and azimuth and elevation difference signals. One type of prior-art monopulse antenna has four feed horns at the focus of a reflector, and a monopulse array antenna may have many antenna elements, beamformed to generate the desired sum and difference signals. In the context of such antennas, the terms "azimuth" and "elevation" are conventionally used, but refer to two mutually orthogonal measurements rather than to actual orientations. In radar parlance, an object "seen on the screen" or located within the antenna beam is termed a "target," regardless of whether it is being targeted or not; thus, a missile, an aircraft, birds, and unwanted returns from ground clutter are all referred to generally as targets. In a monopulse antenna system, the presence of the target is determined by the existence of a signal within the sum beam. In the presence of a target as determined from the sum beam, the elevation difference signal is normalized by dividing by the sum signal to generate values which establish the elevation angle, and the azimuth difference signal is divided by the sum signal to generate values which determine the azimuth angle. The quotients of the divisions are applied to look-up tables in order to determine the corresponding angular location within an antenna beam.

The beamwidth of an antenna is inversely related to the linear dimensions of an antenna measured in wavelengths; as the antenna gets smaller relative to the wavelength, the beamwidth gets larger. Some systems, like radar systems or missile seeking systems, track their targets by use of the main lobe of an antenna. In general, mobile devices must use small antennas, even when operated at the highest practical frequency, and the antenna thus tends to have a wide main beam, which imposes limits on the ability of a system to identify closely spaced sources, which in the case of a missile might cause the missile to home on a decoy located near the actual target, or to home on ground reflections. In the context of a ground-based search radar system, the time required to complete the scanning of a hemisphere requires that the antenna beam be relatively broad or large (have a large angular dimension). Thus, the antenna beam of the scanning radar antenna, being broad, is likely to contain a plurality of targets. The look-up tables of a monopulse antenna system cannot provide angles in the presence of multiple targets within the main beam of the antenna.

Improved monopulse target or source location is desired.

SUMMARY OF THE INVENTION

A method for identifying the location or angular direction of a single target within the main beam of a monopulse antenna according to an aspect of the invention includes the step of generating sum, elevation difference, azimuth difference, and double difference signals from the signals of the monopulse antenna. A covariance matrix is generated from the sum, elevation difference, azimuth difference, and double difference signals. The direction of the single target is determined by use of at least the principal eigenvector of the covariance matrix. In a particular embodiment of this aspect of the invention, the step of determining the direction of the single target includes the further step of taking the quotient of a first and a second element of the principal eigenvector, to thereby produce a first quotient, and taking the quotient of the first and a third element of the principal eigenvector, to thereby produce a second quotient. The real parts of the first and second quotients are deemed to establish the angles of the single target, which can be determined in conventional manner by recourse to a look-up table.

Another method according to an aspect of the invention identifies the angular locations of plural targets lying within a beam of a monopulse receiving antenna, where the monopulse receiving antenna includes four receive ports, namely sum, elevation difference, azimuth difference, and double difference ports. The method according to the invention includes the step of generating a covariance matrix representing the signals received by the antenna and appearing at the sum, elevation difference, azimuth difference, and double difference ports. The method also includes the step of generating eigenvalues of the covariance matrix, and deeming the number of targets or sources within the main beam to be equal to the number of significant eigenvalues. According to an aspect of the invention, if the number of sources is deemed to be two, the angular locations of the two targets are determined from a system of two-dimensional equations derived from the noise eigenvectors of the covariance matrix. The two-dimensional equations may be generated regardless of the number of targets, or they may be generated only when the number of targets is two.

In a particular mode of the method, the step of determining the number of targets within the main beam based on the eigenvalues of the covariance matrix includes the step of performing an eigenvalue decomposition of the covariance matrix to generate eigenvalues. These eigenvalues may be viewed as representing the energy of the signal received from each of the targets. The method also includes the further step of determining the number of significant eigenvalues, and deeming the number of significant eigenvalues to equal the number of targets or sources. Determination of the number of significant eigenvalues, in turn, may be accomplished by comparing the eigenvalues, or the magnitudes of the eigenvalues, with a threshold value, and deeming those of the eigenvalues which exceed the threshold value to be significant and therefore indicative of the number of targets.

In another mode of the method according to an aspect of the invention, the step of determining the angular locations of the two targets from a system of two-dimensional equations derived from the noise eigenvectors of the covariance matrix includes the step of solving preexisting two-dimensional polynomials derived from the noise eigenvectors of the covariance matrix for azimuth and elevation components of angular location within the main beam. As an alternative, the step of determining the angular locations of the two targets may include the step of generating two-dimensional polynomials derived from the noise eigenvectors of the covariance matrix in response to the determination of the existence of the two targets, followed by solution of the is two-dimensional polynomials.

The two-dimensional polynomials are generated from the covariance matrix.

A missile homes on a selected one of the two targets lying within the main beam, by use of extrinsic information to select one of the two targets.

BRIEF DESCRIPTION OF THE DRAWING

FIG. 3 is a simplified flow chart illustrating the processing according to an aspect of the invention, for determining the locations of two targets lying within the main beam of the antenna using the horns of FIG. 2a; and FIG. 4 is a simplified diagram of a missile including a control system which, in the presence of two targets within the main beam, uses extrinsic information to select one of the targets to home on.

DESCRIPTION OF THE INVENTION

Figure 1:
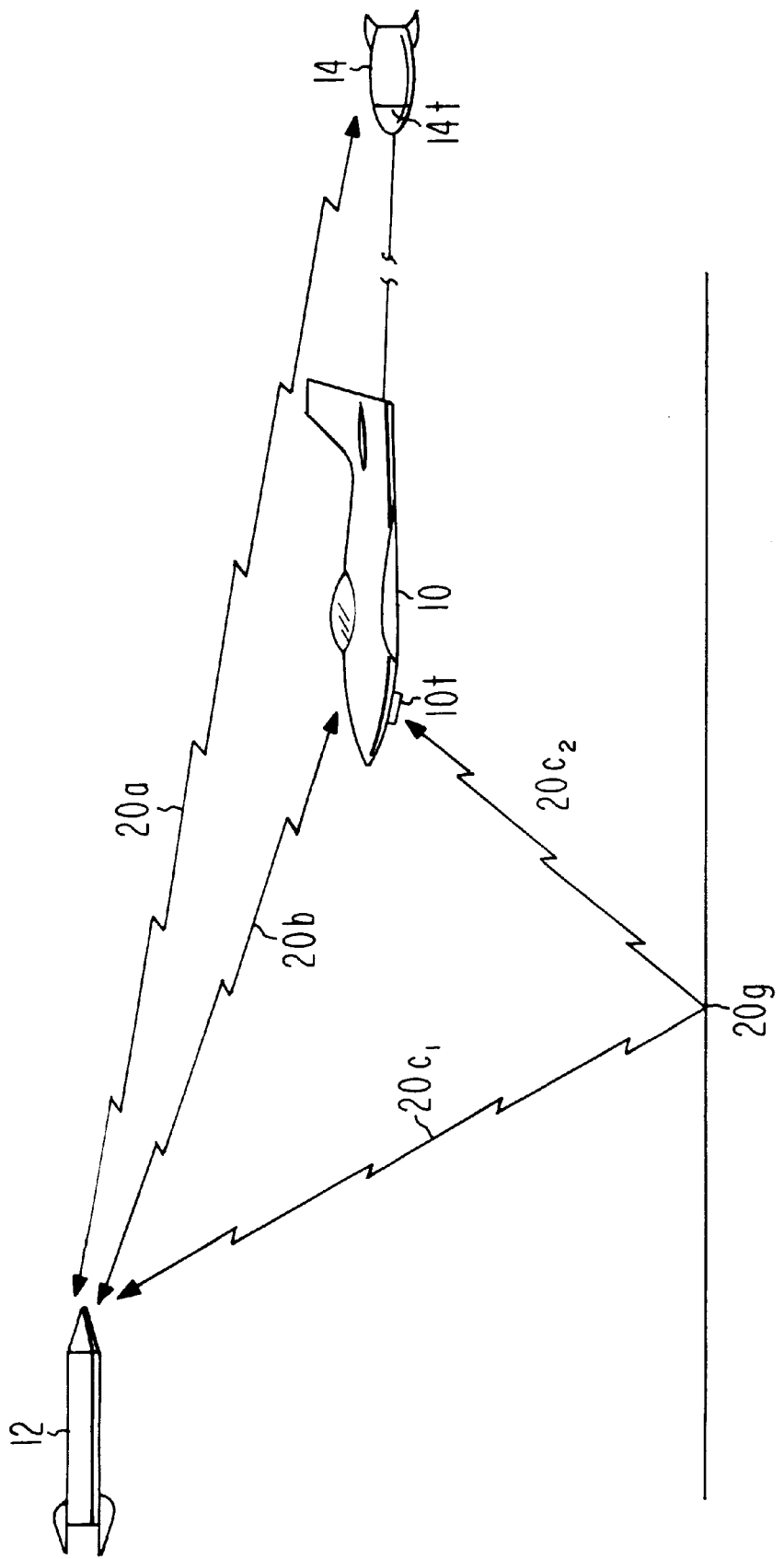
FIG. 1 is a simplified representation of a missile attacking a target aircraft using a repeater and towing a decoy.

In FIG. 1, an aircraft 10 is represented as being attacked by a missile 12. Missile 12 determines the location of the target aircraft 1o by use of radar using monopulse techniques. The target aircraft 10 defends itself by two different methods, namely by the use of a decoy 14, and by the use of a ground-pointing transponder 10t. Various radar beams generated by the missile 12 are represented by "lightning bolt" symbols 20a, 20b, and $20c_1$. Antenna beams 20a, 20b, and $20c_1$ may be generated either simultaneously or sequentially. Antenna beam 20 is directed toward the decoy, beam 20b is directed toward the aircraft, and beam $20c_1$ is directed toward the ground at a location 20g. Since the decoy 14 is smaller than the aircraft, its radar signature or reflection as perceived by the missile on beam 20a would ordinarily be smaller than that of the aircraft as perceived on beam 20b. In an attempt to make the decoy appear, to the missile 12, to be larger than the aircraft, the decoy includes a transponder 14t, which receives the transmitted radar signals arriving over antenna beam 20a, and amplifies and retransmits the signals. The amplified and retransmitted signals retrace their paths over beam 20a, and arrive back at the missile with greater amplitude than the signals transmitted over antenna beam 20b and reflected by aircraft 10.

The aircraft 10 of FIG. 1 may operate its ground-directed transponder 10t, in such a manner as to retransmit those signals transmitted by missile 12 over antenna beam $20c_1$, reflected from that portion of the Earth's surface lying near location 20g, and arriving at the aircraft 10 by way of path $20c_2$. At least some of the energy retransmitted by transponder 10t flows along path $20c_2$, is reflected from location 20g, and flows back along path $20c_1$ to the missile. The transponder 10t may be used instead of the decoy 14, or in conjunction with the decoy 14, or the decoy 14 may be used alone. Regardless of which defense technique is used by aircraft 10, the missile receives strong signals from directions which are not the direction of the target aircraft, and may not be able to correctly identify the direction of the aircraft relative to the missile.

The problem of identification of the proper target is exacerbated when the main beam or main lobe of the antenna is relatively wide, because the main beam of the radar of missile 12 may subtend both the aircraft 10 and the decoy 14, or both the aircraft 10 and the ground reflection region 20g. This state of affairs is equivalent to beams 20a and 20b of FIG. 1, or beams 20a and 20c, being parts of one beam. When the main beam subtends two targets, the conventional monopulse system is incapable of separating the signals, and so a combined signal is used to access the look-up table which quantifies the shape of the main beam, with the result that the two targets may be misidentified as one, and the location of the "single" target will be in error.

Figure 2A:
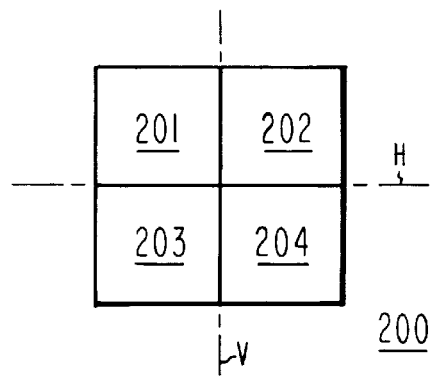
FIG. 2a is a simplified representation of the physical arrangement of an antenna made up of multiple horn antennas.
Figure 2B:
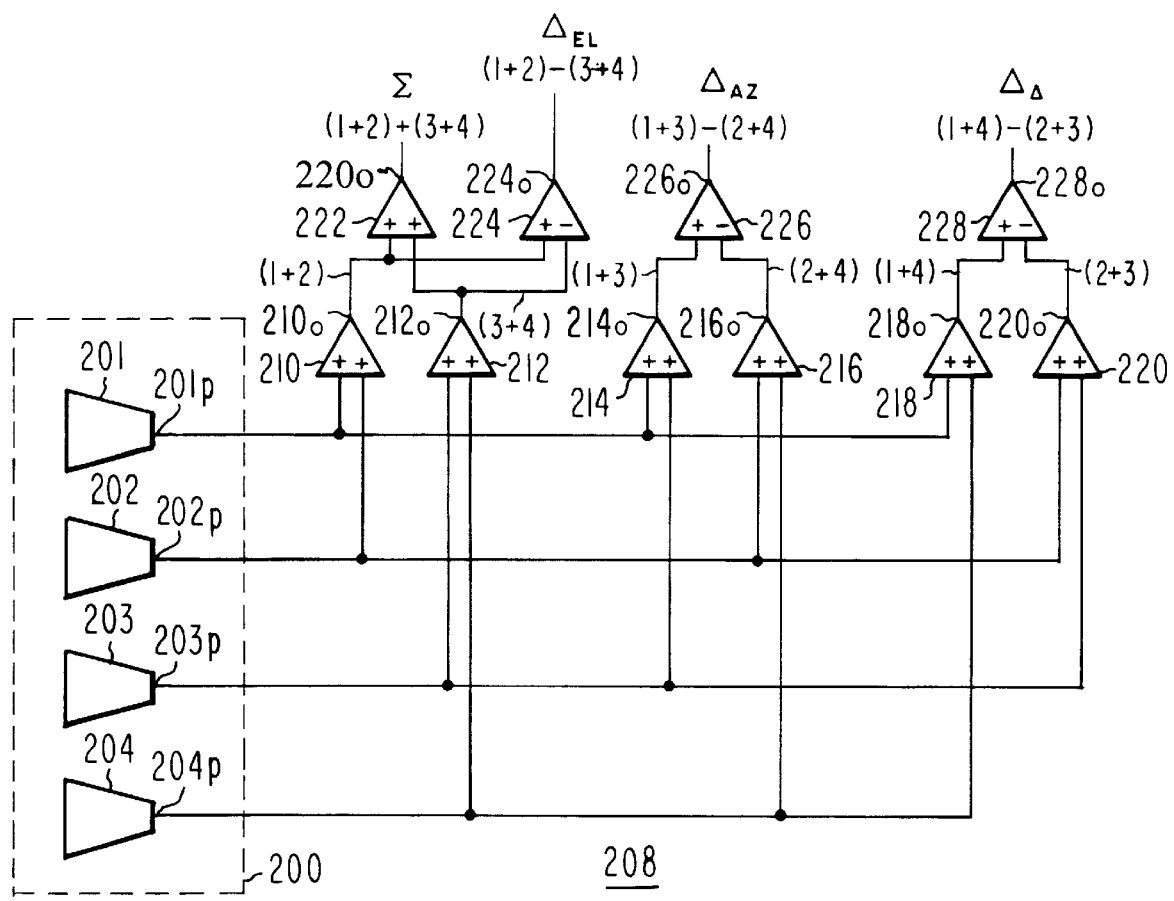
FIG. 2b is a simplified block diagram showing the connections of the horns of FIG. 2a to generate monopulse signals according to an aspect of the invention.

FIG. 2a is a simplified physical representation of a four-horn monopulse antenna 200. In FIG. 2a, each of four horn apertures ("horns") are designated as 201, 202, 203, and 204. Horn 201 lies over horn 203, and horn 202 lies over horn 204, thus, horns 201 and 202 lie above a horizontal plane of separation H. Similarly, horns 201 and 203 lie to the left, and horns 202 and 204 lie to the right, of a vertically oriented plane of separation V. FIG. 2b is a simplified illustration of the connections of horns 201, 202, 203, and 204 of antenna 200 of FIG. 2a for generation of sum and difference beams in accordance with an aspect of the invention. More particularly, an output port 201P of horn 201 is connected to noninverting (+) input ports of summing circuits or adders 210, 214, and 218; an output port 202P of horn 202 is connected to noninverting input ports of summing circuits 210, 216, and 220, an output port 203P of horn 203 is connected to noninverting input ports of summing circuits 212, 214, and 220, and an output port 204P of horn 204 is connected to noninverting input ports of summing circuits 212, 216, and 218. As a result of these connections, the signal at the output port 210o of summing circuit 210 represents the sum of the signals of horns 201 and 202, or in the notation of FIG. 2b, "(1+2)". Similarly, the output signal at output port 212o of summing circuit 212 represents the sum of the signals of horns 203 and 204, or (3+4). The output signal at output port 214o of summing circuit 214 represents (1+3), the output signal at output port 216o of summing circuit 216 represents (2+4), the output signal at output port 218o of summing circuit 218 represents (1+4), and the output signal at output port 220o of summing circuit 220 represents (2+3).

In FIG. 2b, a summing circuit 222 has its noninverting input ports coupled to output ports 210o and 212o of summing circuits 210 and 212, respectively, for producing, at its output port 222o, the sum ($\Sigma$) signal representing (1+2)+(3+4). A summing circuit 224 has a noninverting input port coupled to output port 210o of summing circuit 210, and an inverting input port coupled to output port 212o of summing circuit 212, for producing, at its output port 224o, the elevation difference ($\Delta_{EL}$) signal representing (1+2)−(3+4). A summing circuit 226 has a noninverting input port coupled to output port 214o of summing circuit 214, and also has an inverting input port coupled to output port 216o of summing circuit 216, for producing, at its output port 226o, the azimuth difference ($\Delta_{AZ}$) signal representing (1+3)−(2+4). A summing circuit 228 has a noninverting input port coupled to output port 218o of summing circuit 218, and also has an inverting input port coupled to output port 220o of summing circuit 220, for producing, at its output port 228o, the double difference ($\Delta_A$) signal representing (1+3)−(2+4).

It should be understood that the arrangement of FIGS. 2a and 2b represents only one kind of monopulse signal generating antenna. Other types are well known, including the array type, in which the beamformer generates the desired beams directly, and these other types of monopulse antennas may be used in a system according to the invention, so long as they are arranged to produce at least the sum signals, and azimuth, elevation, and double difference signals.

Figure 3:
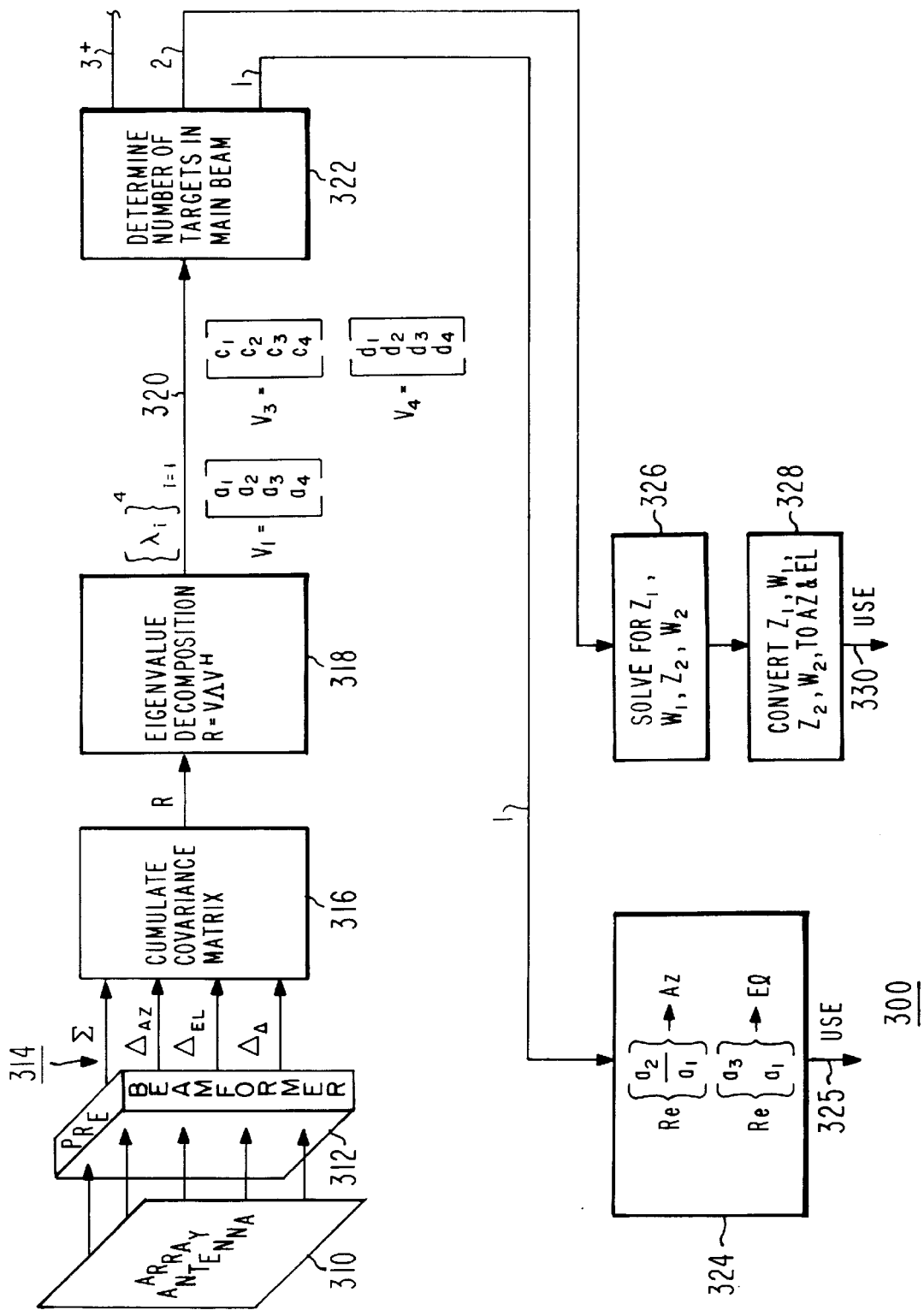

FIG. 3 is a simplified chart which illustrates a mode of processing in accordance with an aspect of the invention. In FIG. 3, the signal starts at an array antenna 310, which couples signals from each of the antenna elements (elements not individually illustrated) a pre-beamformer block 312 of processing designated generally as 300. Pre-beamformer block 312 processes the signals from the elements to produce the sum ($\Sigma$), azimuth difference ($\Delta_{AZ}$), elevation difference ($\Delta_{EL}$), and double difference ($\Delta_\Delta$) signals. The $\Sigma$, $\Delta_{AZ}$, $\Delta_{EL}$, and $\Delta_\Delta$ signals are applied from block 312, by way of a path 314, to a block 316, which cumulates data to form the 4×4 covariance matrix R. Cumulation of data to form a covariance matrix is well known in the art, with the only difference between block 316 and the conventional prior art lying in the additional $\Delta_\Delta$ data which is cumulated with the remaining data.

From block 316 of FIG. 3, the covariance matrix R is applied to a block 318, which represents eigenvalue decomposition of matrix R by $$R = V \Lambda V^H \qquad (1)$$

where:

$\Lambda$ represents the eigenvalues;

V is the 4×4 eigenvector matrix [$v_1$ $v_2$ $v_3$ $v_4$];

$v_1$, the principal eigenvector, is a column vector of elements $a_1$, $a_2$, $a_3$, $a_4$, $v_2$ is not used, $v_3$ is a column vector of elements $c_1$, $c_2$, $C_3$, $c_4$, $v_4$ is a column vector of elements $d_1$, $d_2$, $d_3$, $d_4$; and $V^H$ is the complex conjugate transpose of matrix V.

Block 318 also produces the eigenvalues $$[\lambda_i]_{i=1}^4 \qquad (2)$$

The eigenvalues are available to block 322 of FIG. 3, which determines the number of targets in the main beam. In a noise-free system, the number of eigenvalues would equal the number of targets, so no determination of significance would be required, and it would only be necessary to count the number of eigenvalues to establish the number of targets. However, the presence of system and thermal noise requires that significance be determined, which is readily accomplished by comparing the eigenvalues with a threshold, and deeming those which are greater than the threshold to be significant, and therefore of interest in determining the number of targets in the main beam. The magnitude of the threshold will, of course, depend upon the noise level of the system, and is easily determined. Once the thresholding is performed, all that is required is to count the number of values which have exceeded the threshold, and to report that number. The count may be one, two, or "three or more." The report of one target is made by raising the logic level or setting a flag on signal path 1, which enables a block 324 to perform processing for establishing the location of the single target within the main beam. Block 324 could represent prior-art processing, but, in the embodiment of FIG. 3, the determination of the location of the single target within the main beam is performed according to an aspect of the invention. If block 322 of FIG. 3 determines that there are three or more targets in the main beam, no report is made, which in FIG. 3 is represented by termination of a signal path 3. No further action is taken, because the prior-art arrangements provide no convenient way to determine the locations of plural targets in the main beam. If the number of targets is determined to be two, block 322 raises a flag on signal path 2, which is coupled to further processing represented by blocks 326 and 328, for determining. according to another aspect of the invention, the locations within the main beam of the two targets.

Block 324 of FIG. 3 represents determination of the location or angular direction of the single target within the main beam of the antenna. The "single target" flag which arrives from block 322 by way of signal path 1 causes block 324 to determine the azimuth component of the single target as $$\text{Re}\{a_2/a_1\} \rightarrow Az \qquad (2a)$$

and the elevation component of the single target as $$\text{Re}\{a_3/a_1\} \rightarrow El \qquad (2b)$$

where the right arrow symbol represents recourse to a look-up table which relates the quotients to the angle, as in the prior art. The use of the eigenvalues or components of the principal eigenvector $v_1$ in this fashion provides better noise performance than prior-art monopulse arrangements for determining the location of a single target within the main beam. In fact, the use of the principal eigenvector in this manner provides a noise "cleaning" capability. The azimuth of the single target is coupled over signal paths 325 to a utilization apparatus.

In the presence of two targets within the main beam, the antenna patterns of the sum ($\Sigma$), azimuth difference ($\Delta_{AZ}$), elevation difference ($\Delta_{EL}$), and double difference ($\Delta_\Delta$) signals in their respective channels are given by $$\Sigma(z, w) = (1+z)(1+w)g_0(z,w) \qquad (3)$$

$$\Delta_A(z,w) = (1+z)(1-w)g_0(z,w) \qquad (4)$$

$$\Delta_E(z,w) = (1-z)(1+w)g_0(z,w) \qquad (5)$$

$$\Delta_\Delta = (1-z)(1-w)g_0(z,w) \qquad (6)$$

where $g_0(z,w)$ is the common antenna factor. For these channels, the array manifold or antenna pattern vector is given by $$V(z,w) = [\Sigma(z,w) \Delta_A(z,w) \Delta_E(z,w) \Delta_\Delta(z,w)]^T \qquad (7)$$

For two signal sources or targets, the two noise space eigenvectors are given by $$v_3 = [c_1 c_2 c_3 c_4]^T \quad v_4 = [d_1 d_2 d_3 d_4]^T \qquad (8)$$

$v_3$ and $v_4$ of equation (8) are orthogonal to the array manifold vector $V(z,w)$, which gives rise to the two two-dimensional polynomial equations (9)

$$v_3^H V(z,w) = 0 \quad v_4^H V(z,w) = 0 \qquad (9)$$

If two targets occur within the main beam, block 326 of FIG. 3 responds, by solving the following equations for $Z_1$, $Z_2$, $W_1$, and $W_2$ $$Z_1 = \frac{-q + \sqrt{q^2 - 4pr}}{2p} \qquad (10)$$

$$Z_2 = \frac{-q - \sqrt{q^2 - 4pr}}{2p} \qquad (11)$$

-continued $$W_1 = \frac{\alpha_1 + \alpha_2 Z_1}{\alpha_3 + \alpha_4 Z_1} \qquad 12$$

$$W_2 = \frac{\alpha_1 + \alpha_2 Z_2}{\alpha_3 + \alpha_4 Z_2} \qquad 13$$

where:

p=($\alpha_2\beta_4+\alpha_4\beta_3$);
  q=($\alpha_3\beta_3+\alpha_1\beta_4-\alpha_4\beta_1-\alpha_2\beta_2$);
  r=−($\alpha_3\beta_1-\alpha_1\beta_2$);
  $\alpha_1$=−($c_1+c_2+c_3+c_4$);
  $\alpha_2$=−($c_1+c_2-c_3-c_4$);
  $\alpha_3$=($c_1-c_2+c_3-c_4$);
  $\alpha_4$=($c_1-c_2-c_3+c_4$);
  $\beta_1$=−($d_1+d_2+d_3+d_4$);
  $\beta_2$=−($d_1-d_2+d_3-d_4$);
  $\beta_3$=($d_1+d_2-d_3-d_4$); and
  $\beta_4$=−($d_1-d_2-d_3+d_4$).

Equations (10) through (13) provide express or closed-form solutions of equations (9) for the desired angles of the two targets in terms of Z and W axes. All that remains is to convert the target angles to Az and El form, which is accomplished in block 328, which determines $\theta_i$ and $\phi_i$ for values of index i of 1 and 2.

$$\theta_i = \sin^{-1}\left[\frac{\mathfrak{I}(\ln[Z_i])}{\frac{2\pi d_y}{\lambda}}\right] \qquad 14$$

$$\phi_i = \sin^{-1}\left[\frac{\mathfrak{I}(\ln[W_i])}{\frac{2\pi d_x \cos\theta_i}{\lambda}}\right] \qquad 15$$

where:

$\mathfrak{I}$ represents the imaginary part;
  $d_x$ represents linear distance in the x direction; and
  $d_y$ represents linear distance in the y direction.

Once the values of azimuth and elevation angle are determined, they may be coupled over signal paths 330 for use by any appropriate system.

Figure 4:
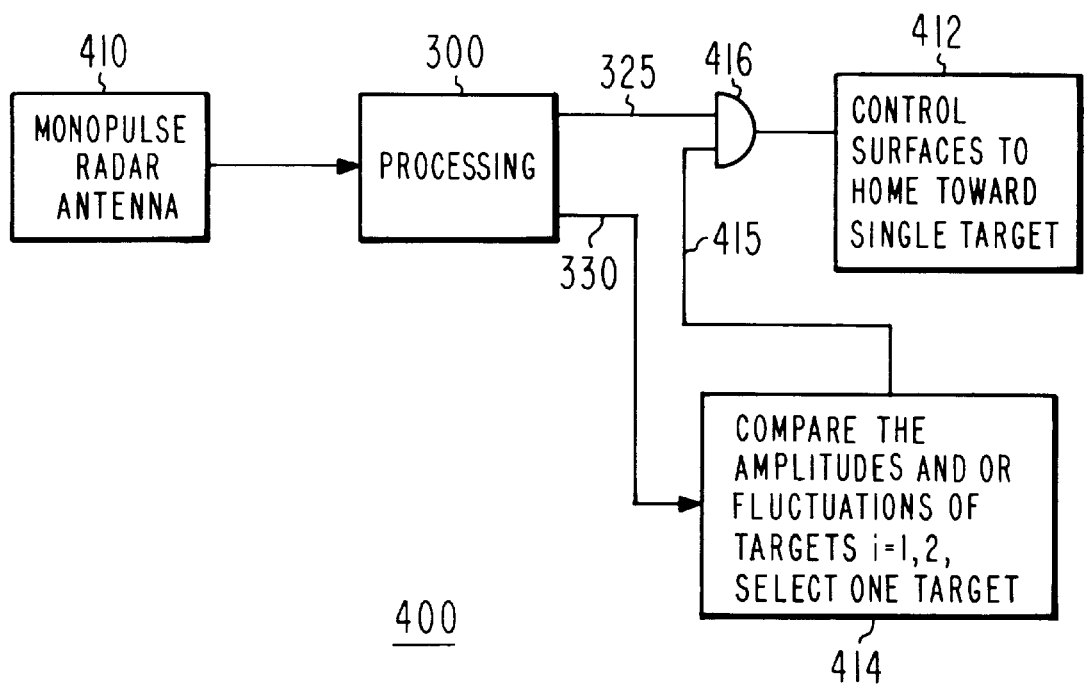

In a particular embodiment of the invention illustrated in FIG. 4, a missile 400 includes a monopulse antenna illustrated as a block 410, which couples signals to a processing block 300 equivalent to the processing described in conjunction with FIG. 3. In FIG. 4, the single-target angular locations are applied over signal paths 325 and an OR gate 416 to a block 412, which represents the controls for moving the control surfaces or thrusters of the missile for causing the missile to home on the target. When two targets are present, the target locations are coupled over signal paths 330 to a block 414. Extrinsic information is now necessary, to allow identification of one of the targets as the correct target, and for eliminating the other from consideration. In the particular embodiment of FIG. 4, the extrinsic information is the fact that the weaker of the two targets is the one on which homing should occur. This bit of information is prestored in block 414, either in the form of software, or in the form of a hard-wired circuit. This type of response is based on the assumption that the target pair represents an enemy aircraft such as aircraft 10 of FIG. 1, which is using one of the two methods described in conjunction with FIG. 1, namely decoy 14 or ground reflection point 20g, to produce a false target. Naturally, other extrinsic information could be used instead of or in addition to the amplitudes of the target signals. One other such piece of information might include the characteristics of the fluctuations of the measured signals; the fluctuations of the signals from the decoy or reflected from the ground may differ from those of the true target. The result of the comparison of the two targets allows the weaker target (or target selected by some other consideration) to be identified as the one on which homing should occur, and the angular position of the weaker target is supplied from OR gate 414 by way of signal paths 415 to block 412, instead of the single-target information. As a result, homing of the missile occurs on the weaker of the two target reflections.

Other embodiments of the invention will be apparent to those skilled in the art. For example, while the summing circuits 210 through 228 have each been described as having two input ports, simplifications of the connections can be achieved by use of summing circuits having more than two input ports, as for example the elevation difference signal produced at output port 224o of FIG. 2b could be produced directly from the horns by the use of a single summing circuit having noninverting input ports coupled to horns 201 and 202, and noninverting input ports coupled to horns 203 and 204. While signal paths have been generally described, such signal paths may be analog or digital, as appropriate for the signal appearing thereon, and in the case of digital signal paths, they may be serial or parallel, as known in the art. Analog signal paths may include conventional analog signal processing devices, such as amplifiers, frequency converters, bandpass, bandreject, and other types of frequency filters, attenuators, matching devices, and the like. Digital signal processing may include various conventional aspects which are not described, such as clock signal generators andor reclocking arrangements, delays and memories, antialias andor other filters, parity verification andor error detection and correction (EDAC) arrangements, and security coding, While the array antenna 310 of FIG. 3 has been illustrated as being rectangular, it could be circular, elliptical, or of irregular shape, and the element locations can be thinned, if desired. A reflector may be associated with the monopulse antenna, as for example the horn array 200 of FIG. 2a could be placed at (or near) the focal point of a reflector; the reflector need not be parabolic, but may be shaped to provide any kinds of beams. Instead of an OR gate such as 416 of FIG. 4, a single-pole, double-throw switch could be used to switch between the single-target and the two-target signals, and the state of the switch could be controlled by the flags on signal paths 1 and 2 of FIG. 3, as by connecting the "movable" switch element to contact signal path 325 when the "one-target" flag is high, and to contact signal path 415 when the "two-target" flag is high.

Thus, a first method according to an aspect of the invention is for identifying the location or angular direction of a single target (10, 14, or 20g) within the main beam (20a, 20b, 20c) of a monopulse antenna (200, 208; 310, 312), and includes the step (208, 312) of generating sum (Σ), elevation difference ($\Delta_{EL}$), azimuth difference ($\Delta_{AZ}$), and double difference ($\Delta_\Delta$) 2signals from the signals of the monopulse antenna (200, 208; 310, 312). A covariance matrix (R) is generated from the sum (Σ), elevation difference ($\Delta_{EL}$), azimuth difference ($\Delta_{AZ}$), and double difference ($\Delta_\Delta$) signals. The direction of the single target is determined by use of at least the principal eigenvector ($v_1$) of the covariance matrix (R) In a particular mode or avatar of this aspect of the invention, the step of determining the direction of the single target includes the further step of taking the quotient of first ($a_1$) and second ($a_2$) elements of the principal eigenvector ($v_1$), to thereby produce a first quotient ($a_2/a_1$), and taking the quotient of the first ($a_1$) and a third ($a_3$) element of the principal eigenvector ($v_1$), to thereby produce a second quotient ($a_3/a_1$). The real parts of the first ($a_2/a_1$) and second ($a_3/a_1$) quotients are deemed to establish the angles of the single target, which are derived from an appropriate look-up table.

Additionally, a mode or method according to a second aspect of the invention identifies the angular locations of plural targets (10, 14) lying within a beam (20a, 20b) of a monopulse antenna (200, 208; 310, 312), which is preferably a receiving antenna, where the monopulse antenna (200, 208; 310, 312) includes four receive ports, namely sum (222o), elevation difference (224o), azimuth difference (226o), and double difference (228o) ports. The method according to the invention includes the step of generating a covariance matrix (R) representing the signals received by the antenna (200, 208; 310, 312) at the sum ($\Sigma$), elevation difference ($\Delta_{EL}$), azimuth difference ($\Delta_{AZ}$), and double difference ($\Delta_A$) ports. The method also includes the step generating eigenvalues of the covariance matrix (R), and deeming the number of targets or sources within the main beam to be equal to the number of significant eigenvalues. According to the invention, if the number of targets or sources is deemed to be two, the angular locations of the two targets are determined from the solution equations ($Z_1$, $Z_2$, $W_1$, $W_2$) of the system of two-dimensional equations (equations (9)) which are derived from the noise eigenvectors, which include both desired signal and noise. Noise eigenvectors are those corresponding to the set of smaller eigenvalues. The two-dimensional equations may be generated regardless of the number of targets which are identified; in other words, the two-dimensional equations are generated during each processing cycle. In the alternative, the two-dimensional equations may be generated only during those processing cycles in which the number of targets is determined to be two.

In a particular mode of the method, the step of determining the number of targets within the main beam, based on the eigenvalues of the covariance matrix (R), includes the step of performing an eigenvalue decomposition (318) of the covariance matrix (R) to generate eigenvalues. These eigenvalues may be viewed as representing the energy of the components of the received signal. The method also includes the further step of determining the number of significant eigenvalues, and deeming the number of significant eigenvalues to equal the number of targets or sources. Determination of the number of significant eigenvalues, in turn, may be accomplished by comparing the eigenvalues, or the magnitudes of the eigenvalues, which are determined in the decomposition step, with a threshold value, and deeming those of the eigenvalues which exceed the threshold value to be significant and therefore indicative of the number of targets.

In another mode of the method according to an aspect of the invention, the step of determining the angular locations of the two targets from a system of two-dimensional equations derived from the noise eigenvectors of the covariance matrix (R) includes the step of solving preexisting (preexisting at the time at which the solution is sought) two-dimensional polynomials ($Z_1$, $Z_2$, $W_1$, $W_2$) derived from the noise eigenvectors of the covariance matrix (R) for azimuth and elevation components of angular location within the main beam. As an alternative, the step of determining the angular locations of the two targets may include the step of generating two-dimensional polynomials derived from the noise eigenvectors of the covariance matrix (R) in response to the determination of the existence of the two targets, followed by solution of the two-dimensional polynomials.

The two-dimensional polynomials are generated from the covariance matrix (R).

In a particular embodiment, a missile (12) includes a monopulse antenna (200, 208; 310, 312) according to the invention, and uses the abovedescribed method to identify the presence of two targets within the beam, and to identify the directions of the two targets. Extrinsic information (414), such as the relative amplitudes of the signals from the two targets, andor their statistical fluctuations, are used to decide which target to attack, and the homing controls of the missile are used to home on the selected target.

What is claimed is:

1. A method for identifying the locations of plural targets lying within the main beam of a monopulse antenna which includes four ports, namely sum, elevation difference, azimuth difference, and double difference ports, said method comprising the steps of:

generating a covariance matrix from the sum, elevation difference, azimuth difference, and double difference signals;

determining the number of targets within the main beam based on the eigenvalues of said covariance matrix;

if the number of targets is two, determining, from a system of two-dimensional equations derived from noise eigenvectors of said covariance matrix, the angular locations of said two targets within said main beam.

2. A method according to claim 1, wherein said step of determining the number of targets within said main beam based on the eigenvalue of the covariance matrix includes the steps of:

performing an eigenvalue decomposition of the covariance matrix to generate eigenvalues; and determining the number of significant eigenvalues.

3. A method according to claim 2, wherein said step of determining the number of significant eigenvalues includes the step of comparing the magnitudes of said eigenvalues determined in said decomposition step with a threshold value, and deeming the number of those of said eigenvalues which have a magnitude which exceeds said threshold value to indicate said number of targets.

4. A method according to claim 1, wherein said step of determining, from a system of two-dimensional equations derived from noise eigenvectors of the covariance matrix, the angular locations of said two targets within said main beam comprises the steps of:

solving said two-dimensional polynomial derived from noise eigenvectors of the covariance matrix for azimuth and elevation components of angular location within said main beam.

5. A method according to claim 4, further comprising the step of generating said two-dimensional polynomial by the steps of:

generating said eigenvectors from said covariance matrix.

6. A method according to claim 1, further comprising the step of recurrently repeating said steps of generating a covariance matrix;

determining the number of targets within said main beam based on eigenvalues of said covariance matrix; and if the number of targets is two, determining the angular locations of said two targets within said main beam.

7. A method for controlling a missile for causing it to home on a target which is generating spoofing signals which are radiated within a main beam of a monopulse antenna of said missile, which monopulse antenna includes four ports, namely sum, elevation difference, azimuth difference, and double difference ports, said method comprising the steps of:

generating a covariance matrix of said sum, elevation difference, azimuth difference, and double difference signals;

determining the number of targets within said main beam based on the eigenvalues of said covariance matrix;

if the number of targets is two, determining, from a system of two-dimensional equations derived from noise eigenvectors of said covariance matrix, the angular locations of said two targets within said main beam.

from other information, identifying one of said two targets as the selected target: and homing said missile toward said selected target.

8. A method for identifying the location or angular direction of a single target within the main beam of a monopulse antenna, said method comprising the steps of:

generating sum, elevation difference, azimuth difference, and double difference signals from the signals of said monopulse antenna;

generating a covariance matrix of said sum, elevation difference, azimuth difference, and double difference signals;

determining the direction of said single target by use of at least the principal eigenvector of said covariance matrix.

9. A method according to claim 8, wherein said step of determining the direction of said single target includes the steps of:

taking the quotient of first and second elements of said principal eigenvector, to thereby produce a first quotient;

taking the quotient of first and third elements of said principal eigenvector, to thereby produce a second quotient; and deeming the real parts of said first and second quotients to be the angles of said single target.

* * * * *